United States Patent
Shimizu

(10) Patent No.: US 8,593,923 B2
(45) Date of Patent: Nov. 26, 2013

(54) OPTICAL DISC APPARATUS

(75) Inventor: Shinya Shimizu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/468,148

(22) Filed: May 10, 2012

(65) Prior Publication Data

US 2012/0307611 A1 Dec. 6, 2012

(30) Foreign Application Priority Data

Jun. 3, 2011 (JP) ................................. 2011-124878

(51) Int. Cl.
*G11B 7/00* (2006.01)

(52) U.S. Cl.
USPC ..................................... 369/53.38; 369/47.17

(58) Field of Classification Search
None
See application file for complete search history.

(56) References Cited

U.S. PATENT DOCUMENTS

| | | | | |
|---|---|---|---|---|
| 4,271,334 | A * | 6/1981 | Yardy | 369/44.32 |
| 6,434,096 | B1 * | 8/2002 | Akagi et al. | 369/44.32 |
| 7,218,582 | B2 * | 5/2007 | Takahashi et al. | 369/44.32 |
| 2004/0027949 | A1 * | 2/2004 | Matsuura et al. | 369/47.51 |
| 2004/0125713 | A1 * | 7/2004 | Takahashi et al. | 369/44.34 |
| 2010/0315933 | A1 | 12/2010 | Iwami | |
| 2012/0307611 | A1 * | 12/2012 | Shimizu | 369/47.15 |

FOREIGN PATENT DOCUMENTS

| | | | |
|---|---|---|---|
| JP | 06274912 A | * | 9/1994 |
| JP | 08-124235 A | | 5/1996 |
| JP | 09-265651 | | 10/1997 |
| JP | 2007-157248 | | 6/2007 |
| JP | 2010-287277 | | 12/2010 |

OTHER PUBLICATIONS

Japanese Office Action issued May 7, 2013 for corresponding Japanese Patent Application No. 2011-124878.
Japanese Office Action in corresponding Japanese Application No. 2011-124878 mailed on Jul. 23, 2013.

* cited by examiner

*Primary Examiner* — Peter Vincent Agustin
(74) *Attorney, Agent, or Firm* — Morgan, Lewis & Bockius LLP

(57) ABSTRACT

An optical disc apparatus includes an optical pickup that emits light to an optical disc and receives reflection light reflected by the optical disc, a temperature sensor for detecting ambient temperature of the optical pickup, a temperature control processing portion that performs a process corresponding to temperature information obtained by the temperature sensor, and a filter portion that performs filtering of a signal about the temperature information during a period until the temperature information detected by the temperature sensor is input to the temperature control processing portion.

6 Claims, 4 Drawing Sheets

OPTICAL DISC APPARATUS

CROSS-REFERENCE TO RELATED APPLICATIONS

This application is based on Japanese Patent Application No. 2011-124878 filed on Jun. 3, 2011, the contents of which are hereby incorporated by reference.

BACKGROUND OF THE INVENTION

1. Field of the Invention

The present invention relates to an optical disc apparatus that is used for reproducing information recorded on an optical disc, and/or for recording information on an optical disc.

2. Description of Related Art

Conventionally, optical disc apparatuses are commonly used, which drive an optical disc to rotate for reproducing information on the optical disc or recording information on the optical disc. Such optical disc apparatus is incorporated in a BD recorder, a BD player, a DVD recorder, a DVD player, or the like, for example. The optical disc apparatus is equipped with an optical pickup that emits light to the optical disc and receives reflection light (return light) reflected by the optical disc. The optical disc apparatus performs reading or writing of information using this optical pickup.

In a conventional optical disc apparatus, a temperature sensor may be disposed in a vicinity of the optical pickup (see, for example, JP-A-2010-287277 or JP-A-2007-157248). Using temperature measured by this temperature sensor, drive control of a semiconductor laser (laser diode) included in the optical pickup or operation control of a lens included in the optical pickup is performed, for example.

Here, as the temperature sensor for measuring the ambient temperature of the optical pickup, a thermistor disposed on a circuit substrate of a circuit for controlling drive of the optical pickup may be used as illustrated in JP-A-2010-287277. Note that as the circuit for controlling drive of the optical pickup, there is a circuit for controlling drive of a light source or a circuit controlling drive of a lens, for example. In addition, the above-mentioned circuit substrate is usually attached to a base of the optical pickup.

SUMMARY OF THE INVENTION

However, in a structure in which the thermistor is disposed on the circuit substrate of the circuit for controlling drive of the optical pickup, the thermistor may be easily affected by heat generated by a heat generating component on the circuit substrate. As a result, the temperature detected by the thermistor may be different from the actual temperature around the optical pickup. Then, if a temperature control process corresponding to temperature information detected by the thermistor (control process based on the detected temperature) is performed, inappropriate process may be performed. Note that as the heat generating component, there is a laser diode driver (LDD) for driving a semiconductor laser, for example.

The above-mentioned temperature difference is apt to occur conspicuously just after the optical disc is inserted into the apparatus so that spin-up is started as illustrated in FIG. 6. Note that the spin-up means a preparing operation for reproducing or recording of the optical disc. In FIG. 6, a horizontal axis represents the lapse time from the start of the spin-up, and a vertical axis represents temperature. In addition, in FIG. 6, a solid line indicates actual temperature in a vicinity of the optical pickup, and a broken line indicates temperature detected by the thermistor.

When the spin-up is started, drive of the LDD that has been turned off is started (for activating the semiconductor laser). Therefore, the ambient temperature of the LDD is rapidly raised so that temperature detected by the thermistor disposed close to the LDD also rises rapidly. On the other hand, the ambient temperature of the optical pickup rises relatively slowly because it is affected not only by the ambient temperature of the LDD, but also by an average temperature around the optical pickup. As a result, the above-mentioned temperature difference occurs.

As a countermeasure against such temperature difference, it is considered to inhibit use of the temperature information obtained by the thermistor for a predetermined period from the start of spin-up with reference to the technique disclosed in JP-A-2010-287277, for example. However, with this structure, there may occur a situation in which reproduction or the like cannot be started for a while, because waiting time until the temperature information obtained by the thermistor becomes usable is elongated. Further, a user may think that the optical disc apparatus with that structure has bad usability. Therefore, other countermeasure is desired.

In view of the above-mentioned problem, it is an object of the present invention to provide an optical disc apparatus that can correctly detect ambient temperature of the optical pickup so as to perform an appropriate temperature control process (control process based on the detected temperature). In particular, it is an object of the present invention to provide a technique for correctly detecting ambient temperature of the optical pickup from the start of spin-up.

In order to achieve the above-mentioned object, an optical disc apparatus of the present invention includes an optical pickup that emits light to an optical disc and receives reflection light reflected by the optical disc, a temperature sensor for detecting ambient temperature of the optical pickup, a temperature control processing portion that performs a process corresponding to temperature information obtained by the temperature sensor, and a filter portion that performs filtering of a signal about the temperature information during a period until the temperature information detected by the temperature sensor is input to the temperature control processing portion (first structure).

With this structure, because the filter portion is inserted, the temperature control processing portion can obtain an appropriate temperature that is not different from actual temperature for ambient temperature of the optical pickup. Then, because the temperature control processing portion can perform appropriate processing operation based on the appropriate temperature, quality of recording and reproducing can be improved.

It is preferred that the optical disc apparatus having the first structure described above further include an A/D converter portion that performs A/D conversion of a signal output from the temperature sensor, and that the filter portion perform filtering during a period until a digital signal output from the A/D converter portion is input to the temperature control processing portion (second structure). In this structure, the filter portion is a digital filter.

In the optical disc apparatus having the first or second structure described above, it is preferred that the filter portion be a low pass filter that cuts off high frequency components of a predetermined frequency or higher (third structure).

In the optical disc apparatus having any one of the first to third structures described above, it is preferred that the temperature control processing portion can selectively use one of temperature information output from the temperature sensor and input after filtered by the filter portion, and temperature information output from the temperature sensor and input without filtered by the filter portion (fourth structure). With this structure, a more appropriate temperature control process can be performed.

In the optical disc apparatus having any one of the first to fourth structures described above, it is preferred that the temperature sensor is a thermistor disposed on a circuit substrate attached to a base of the optical pickup. In this structure, the temperature sensor is apt to be affected by a heat generating component such as the LDD disposed on the circuit substrate so that temperature detected by the temperature sensor is apt to be different from actual temperature around the optical pickup, but because the filter portion is disposed, appropriate temperature detection can be performed.

According to the present invention, it is possible to provide an optical disc apparatus that can correctly detect ambient temperature of the optical pickup from the start of spin-up, so that an appropriate temperature control process can be performed.

DETAILED DESCRIPTION OF THE PREFERRED EMBODIMENTS

Hereinafter, an embodiment of an optical disc apparatus of the present invention is described in detail with reference to the attached drawings.

Figure 1:
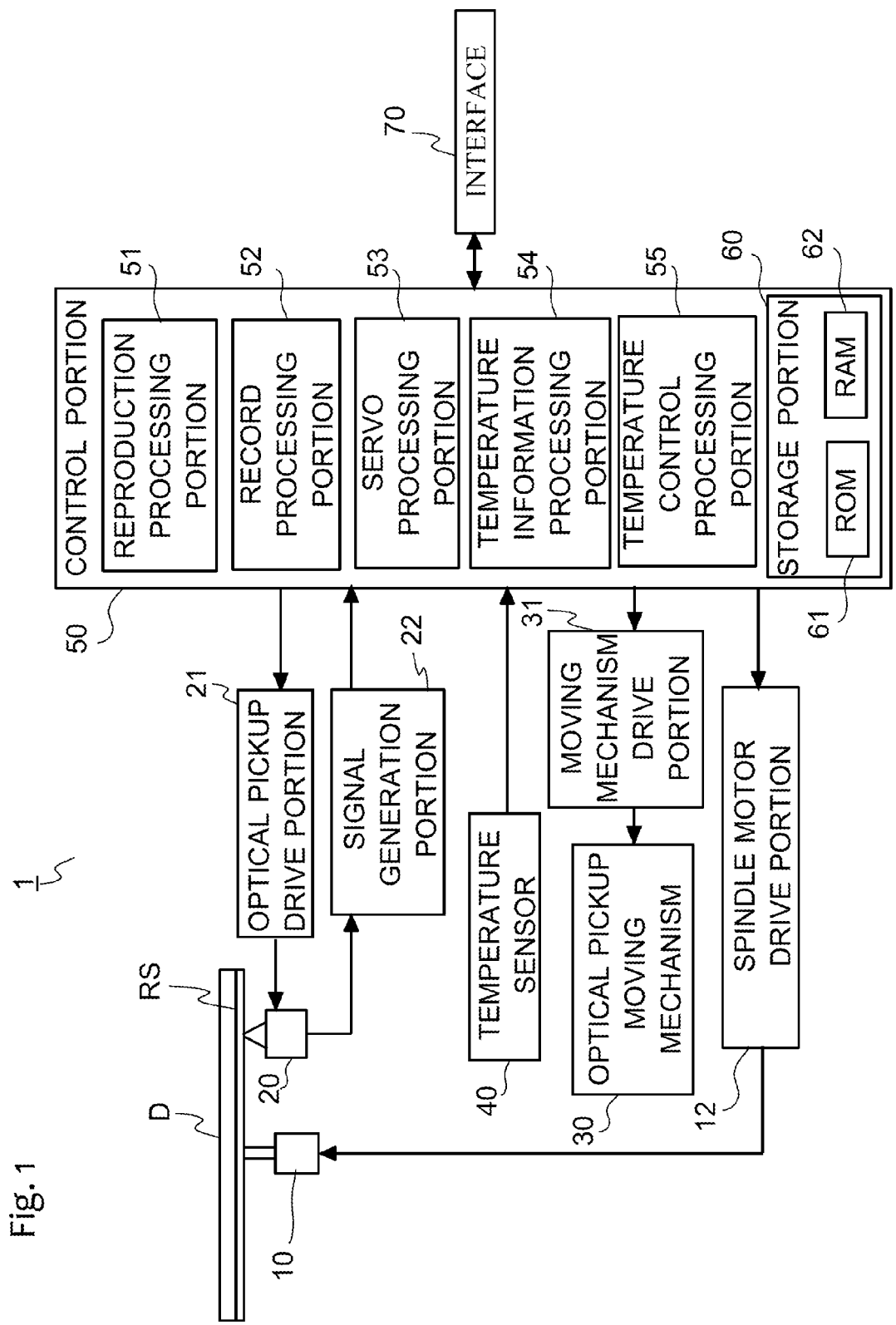
FIG. 1 is a block diagram illustrating an optical disc apparatus according to an embodiment of the present invention.

FIG. 1 is a block diagram illustrating a structure of an optical disc apparatus 1 according to an embodiment of the present invention. As illustrated in FIG. 1, the optical disc apparatus 1 includes a spindle motor 10. An output shaft of the spindle motor 10 is connected to a turn table (not shown) for retaining an optical disc D in a detachable manner. Therefore, when the spindle motor 10 is rotated, the optical disc D retained by the turn table can be rotated. Drive control of this spindle motor 10 is performed by a spindle motor drive portion 12 (driver).

Figure 2:
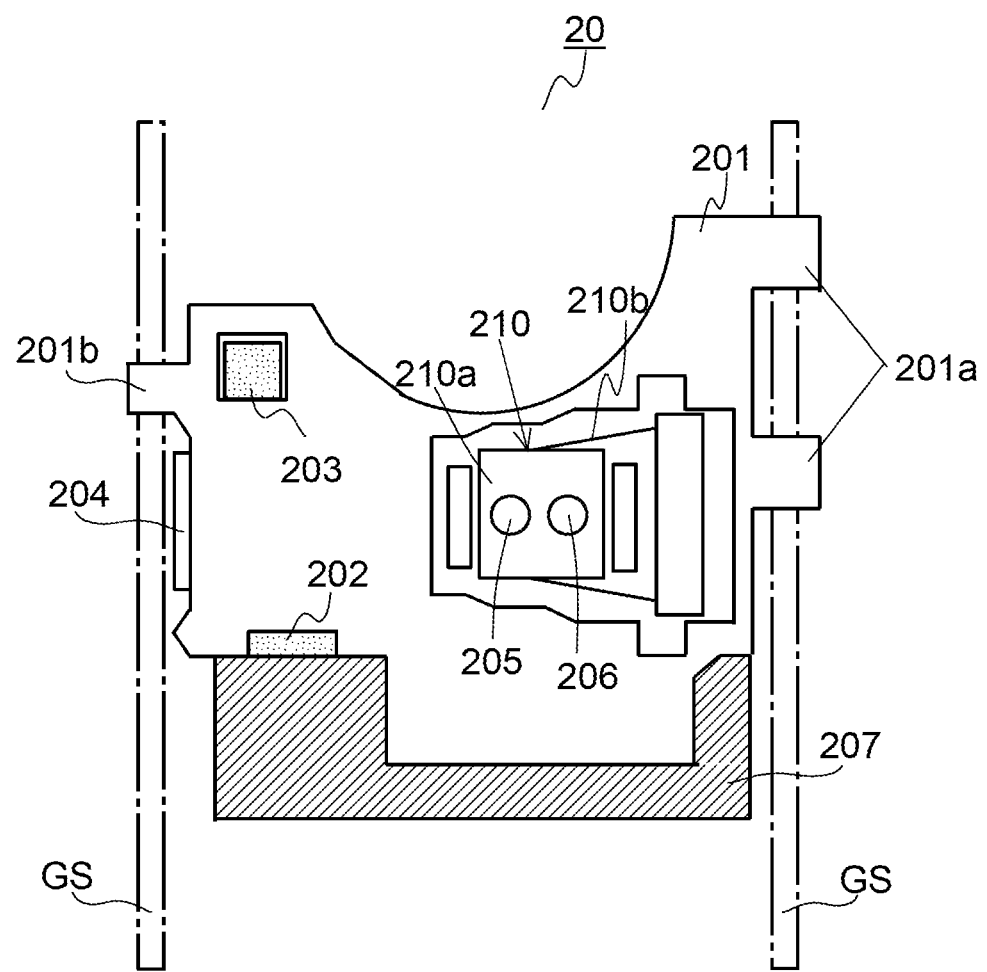
FIG. 2 is a schematic plan view illustrating an appearance structure of an optical pickup of this embodiment.

In addition, the optical disc apparatus 1 includes an optical pickup 20 that emit light to the optical disc D and receives light reflected by the optical disc D. This optical pickup 20 is a device for reading information recorded on the optical disc D and writing information on the optical disc D. FIG. 2 is a schematic plan view illustrating an appearance structure of the optical pickup 20 of this embodiment. Note that when the optical pickup 20 illustrated in FIG. 2 reads information on the optical disc D, the optical disc D is disposed in front of the paper surface.

The optical pickup 20 includes a base 201 on which various members necessary for reading and writing information are mounted (an example of the base of the present invention). Because the base 201 is supported in a slidable manner by two guide shafts GS disposed in the optical disc apparatus 1, the optical pickup 20 can move in a radial direction of the optical disc. Further, with this structure, the optical pickup 20 can read and write information by making access to a desired address on the rotating optical disc D.

Note that supporting of the base 201 by the guide shaft GS is performed by using bearing portions 201a and 201b disposed at left and right end portions of the base 201.

The various members mounted on the base 201 includes semiconductor lasers (light sources) 202 and 203 for emitting light to the optical disc D, a photodetector 204 for receiving return light (reflection light) from the optical disc D so as to perform photoelectric conversion, and various optical members for projecting laser light emitted from the semiconductor laser 202 or 203 to the optical disc D and for guiding return light from the optical disc D to the photodetector 204.

The optical members includes objective lenses 205 and 206, and a collimator lens (that is embedded in the base 201 and is not illustrated in FIG. 2). The objective lenses 205 and 206 are lenses for condensing light emitted from the semiconductor lasers 202 and 203 onto an information recording surface RS of the optical disc D. The objective lenses 205 and 206 are mounted on an actuator 210 attached and embedded in the base 10, so as to be capable of moving in a focus direction (approaching and separating direction with respect to the optical disc D; the direction perpendicular to the paper sheet of FIG. 2) and in a tracking direction (direction parallel to the radial direction; up and down direction in FIG. 2).

The actuator 210 includes a lens holder 210a for holding the objective lenses 205 and 206, and the lens holder 210a is supported with a wire 210b in a swinging manner. Then, the lens holder 210a (namely the objective lenses 205 and 206) is moved by a force generated using a coil and a magnet. Because this type of actuator is known, detail description of the structure is omitted here.

The collimator lens (not shown) is disposed in a light path between the semiconductor laser 202 or 203 and the objective lens 205 or 206 and can move in the optical axis direction. The collimator lens is capable of moving in this way, in order to adjust a degree of convergence or divergence of light entering the objective lens 205 or 206 so that influence of spherical aberration can be appropriately suppressed.

Note that the optical pickup 20 includes a plurality (two each) of semiconductor lasers and objective lenses, in order to secure compatibility among a plurality of optical disc types (for example, BD, DVD, and CD). In addition, the optical pickup 20 has a structure in which a plurality of optical members (including the collimator lens) and the photodetector 204 are shared between the case of using the semiconductor laser 202 and the case of using the semiconductor laser 203.

With reference to FIG. 1 again, an optical pickup drive portion 21 includes an LDD for driving the semiconductor lasers 202 and 203. This LDD is disposed on a circuit substrate 207 that is attached to the rear side of the base 201 of the optical pickup 20 (the side opposite to the side facing the optical disc D) (see FIG. 2). Other than that, the optical pickup drive portion 21 also includes a driving circuit for performing drive control of the actuator 210 and a mechanism for moving the collimator lens in the optical axis direction.

In addition, a signal generation portion 22 performs calculation operation on the electric signal output from the photodetector 204 so as to generate a reproduction RF signal, a focus error (FE) signal, a tracking error (TE) signal, and the like, which are output to a control portion 50.

An optical pickup moving mechanism 30 is a mechanism capable of moving the optical pickup 20 in the radial direction. This optical pickup moving mechanism 30 can be realized by using, for example, a lead screw and a teeth member (engaging member) that engages with the lead screw to convert rotation of the lead screw into a linear movement, though this is not a limitation. The teeth member is fixed to the base 201 of the optical pickup 20. Drive control of the optical pickup moving mechanism 30 is performed by a moving mechanism drive portion 31 (driver).

A temperature sensor 40 is a thermistor disposed on the circuit substrate 207 attached onto the base 201 of the optical pickup 20.

The control portion 50 is constituted of a microcomputer, for example, and performs an appropriate control process corresponding to an operation to be performed by each of the members constituting the optical disc apparatus 1, and performs calculation operation necessary for control. The control portion 50 is equipped with a storage portion 60 including a read only memory (ROM) 61 and a random access memory (RAM) 62. The ROM 61 stores various parameters and operational programs necessary for the control portion 50 to perform various processes. The RAM 62 is used as a working area or a storage area of various types of information.

A reproduction processing portion 51 included in the control portion 50 performs a decoding process of the reproduction RF signal generated by the signal generation portion 22 and outputs reproduced data externally via an interface 70. In addition, a record processing portion 52 included in the control portion 50 performs a process of encoding data input from the outside via the interface 70. The control portion 50 outputs a control instruction concerning the optical pickup 20 to each portion based on the encoded data. Based on this instruction, the optical pickup 20 is operated so that information is written (recorded) on the optical disc D.

A servo processing portion 53 included in the control portion 50 generates a focus drive signal for focus servo control based on the FE signal and generates a tracking drive signal for tracking servo control based on the TE signal. The control portion 50 issues a control instruction concerning the actuator 210 based on the obtained focus drive signal and tracking drive signal. Thus, the actuator 210 is operated so that the servo control is performed. In this case, the control portion 50 also controls the optical pickup moving mechanism 30 appropriately.

A temperature information processing portion 54 included in the control portion 50 appropriately processes a signal output from the temperature sensor (thermistor) 40 so as to give temperature information to a temperature control processing portion 55. Details of this temperature information processing portion 54 will be described later.

The temperature control processing portion 55 included in the control portion 50 performs a temperature control process corresponding to temperature data (temperature information) given from the temperature information processing portion 54. This temperature control process may include, for example, a process of driving the actuator 210 based on the temperature data so as to change a tilt quantity of the objective lens 205 or 206. In addition, the temperature control process may include a process of controlling a mechanism of driving the collimator lens based on the temperature data so as to change a position of the collimator lens in the optical axis direction. In addition, the temperature control process may include a process of changing a target level of laser power of the semiconductor laser 202 or 203 based on the temperature data.

Figure 3:
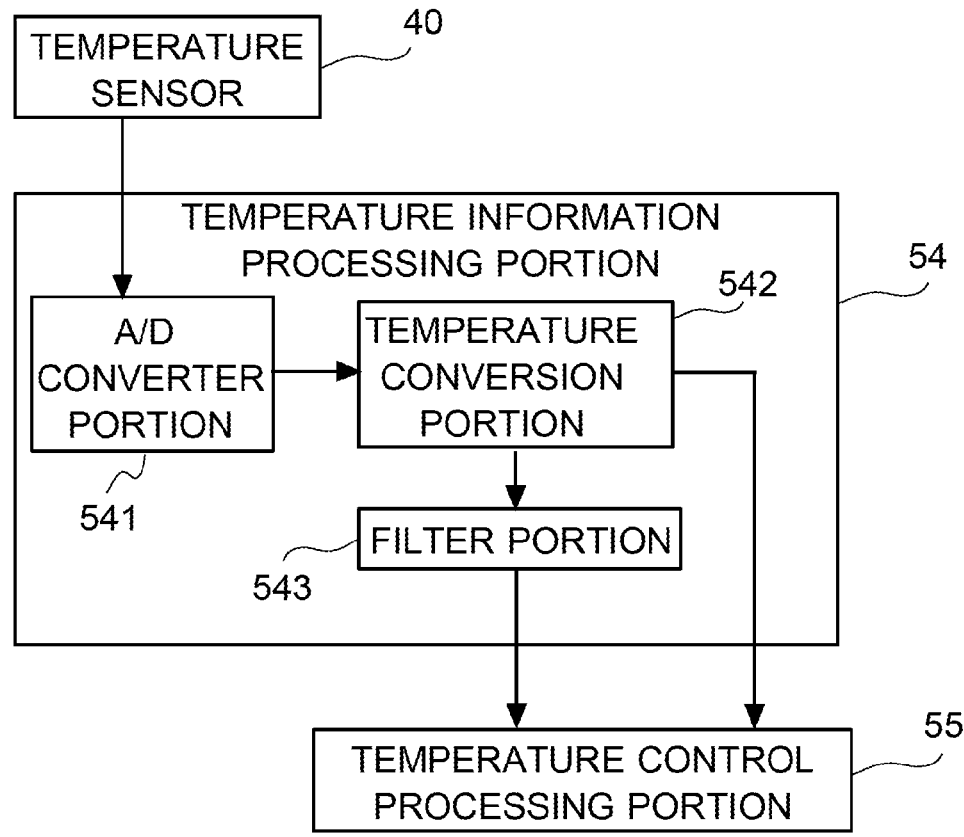
FIG. 3 is a block diagram illustrating a structure of a temperature information processing portion included in the optical disc apparatus according to this embodiment.

FIG. 3 is a block diagram illustrating a structure of the temperature information processing portion 54 included in the optical disc apparatus 1 according to this embodiment. As illustrated in FIG. 3, the temperature information processing portion 54 includes an A/D converter portion 541, a temperature conversion portion 542, and a filter portion 543.

The A/D converter portion 541 converts an analog signal output from the temperature sensor (thermistor) 40 into a digital signal. The temperature conversion portion 542 converts the digital signal (voltage value) output from the A/D converter portion 541 into temperature data in accordance with a conversion table prepared in advance. The temperature conversion portion 542 outputs the obtained temperature data signal to the filter portion 543 and also to the temperature control processing portion 55.

The filter portion 543 performs filtering of the temperature data signal output from the temperature conversion portion 542. The filter portion 543 outputs the filtered temperature data signal to the temperature control processing portion 55. In other words, the temperature control processing portion 55 is supplied with both the temperature information that is output from the temperature conversion portion 542 and is filtered, and the temperature information that is output from the temperature conversion portion 542 and is not filtered. The reason why the two pieces of temperature information are input to the temperature control processing portion 55 in this way will be described later.

Figure 4:
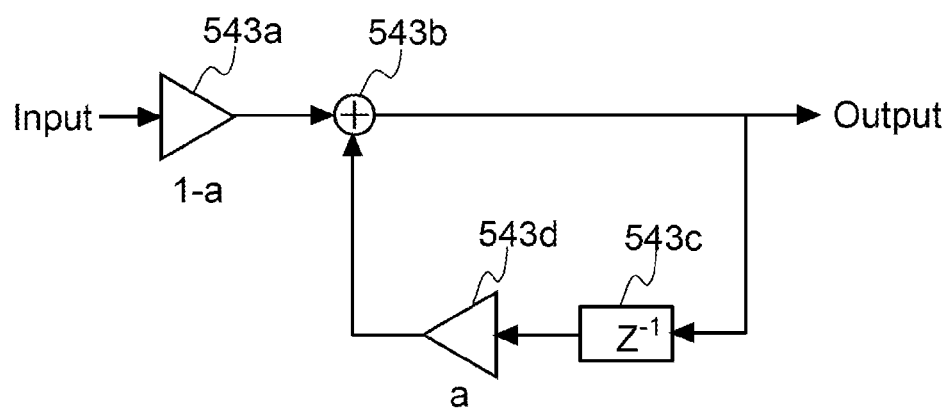
FIG. 4 is a block diagram of a filter process performed by a filter portion included in the temperature information processing portion of the optical disc apparatus according to this embodiment.

FIG. 4 is a block diagram of a filter process performed by the filter portion 543 included in the temperature information processing portion 54 of the optical disc apparatus 1 according to this embodiment. A first multiplying portion 543a illustrated in FIG. 4 multiplies the input by (1−a) and outputs the result. An adding portion 543b outputs a sum of two input signals. A delay portion 543c delays a signal by one period. A second multiplying portion 543d multiplies an input by "a" and outputs the result. This structure is known as a first order low pass filter (LPF) that cuts off high frequency components of a predetermined frequency or higher.

Figure 6:
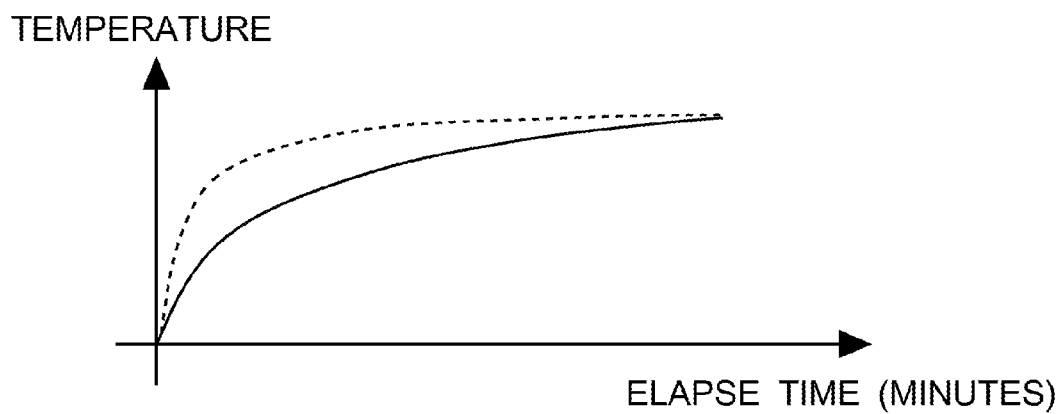
FIG. 6 is a graph illustrating a state in which temperature detected by the thermistor becomes different from an actual temperature around the optical pickup just after the start of spin-up.

In the optical disc apparatus 1, because the thermistor 40 is disposed on the circuit substrate 207 on which a heat generating component such as the LDD is mounted, a detected temperature by the thermistor 40 becomes higher than actual temperature around the optical pickup 20 just after start of spin-up (see FIG. 6 referred to in the above description). As to this point, because the filter portion 543 functioning as a first order LPF is provided, a difference between the detected temperature by the thermistor 40 and the actual temperature around the optical pickup 20 can be eliminated. Note that it is found experimentally that the above-mentioned difference can be eliminated appropriately by setting a cut-off frequency of the filter portion 543 to 0.001 Hz, for example.

Here, as described above, in the optical disc apparatus 1, the temperature control processing portion 55 is supplied with two sets of temperature data (temperature information) including data that is filtered and data that is not filtered. This is in order that the temperature control processing portion 55 can use one of two sets of temperature data selectively.

For instance, after sufficient time has elapsed from the start of spin-up, the temperature detected by the thermistor 40 is scarcely different from actual temperature around the optical pickup 20 (see FIG. 6). Therefore, after sufficient time has elapsed from the start of spin-up, for example, it may be better not to filter the signal output from the thermistor 40 for giving preferred temperature information. Other than that, depending on content of the temperature control process, it may be better to use the temperature data from the thermistor 40 affected by heat from the heat generating component for performing the temperature control process. Therefore, it is preferred to adopt a structure in which the temperature control processing portion 55 can use one of two sets of temperature data selectively like this embodiment.

As described above, the optical disc apparatus 1 according to this embodiment can correctly detect ambient temperature of the optical pickup even just after the start of spin-up. Therefore, it can be expected that accuracy of the temperature control process will be improved in the optical disc apparatus 1. As a result, it can be expected that quality of recording and reproducing by the optical disc apparatus 1 will be improved.

The embodiment described above is an example of the present invention, and an application range of the present invention is not limited to the structure of the embodiment described above.

For instance, the embodiment described above has a structure in which the filter portion 543 filters the signal output from the temperature conversion portion 542. However, the present invention is not limited to this structure. For instance, it is possible to adopt a structure in which the filter portion filters the signal output from the A/D converter portion 541. In addition, it is possible to adopt a structure in which the signal before being input to the A/D converter portion 541 is filtered. In this case, the filter portion is constituted of a resistor and a capacitor instead of a program or software.

Figure 5:
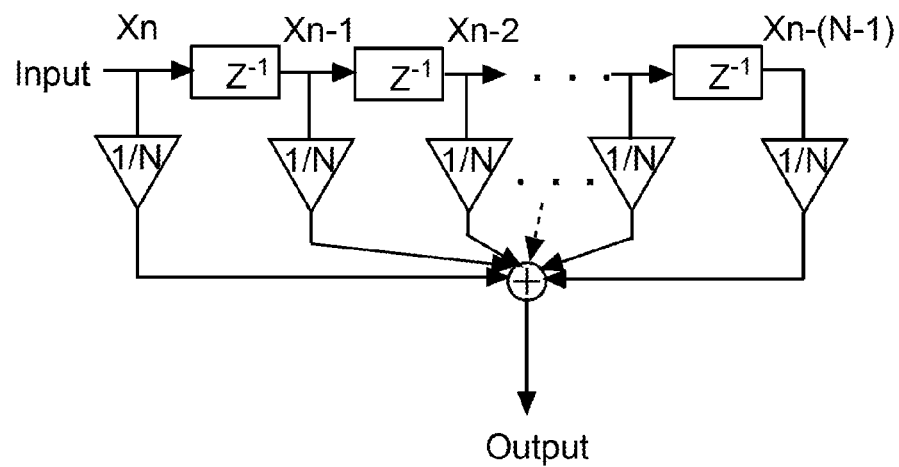
FIG. 5 illustrates another structure of the block diagram of the filter process performed by the filter portion included in the temperature information processing portion of the optical disc apparatus according to this embodiment.

In addition, the structure of the filter portion 543 of the embodiment described above (filter process block diagram) is merely an example. For instance, the filter portion may have a structure in which a plurality of structures of the first order LPF (structures illustrated in FIG. 4) are arranged in parallel. In addition, the process block of the filter portion may be a so-called moving average process block including a plurality (N) of multiplying portions, a plurality (N−1) of delay portions, and an adding portion as illustrated in FIG. 5. Note that a value of N in FIG. 5 may be appropriately determined.

In addition, in the embodiment described above, the temperature control processing portion 55 is supplied with two sets of temperature data (temperature information) including filtered data and unfiltered data. However, the present invention is not limited to this structure. In other words, it is sufficient that the temperature control processing portion 55 can use one of two pieces of temperature information selectively. It is possible to adopt a structure in which one of two pieces of temperature information is selected by a switching portion and is input to the temperature control processing portion 55. In addition, it is possible not to input the unfiltered data to the temperature control processing portion 55 in a certain case.

In addition, in the above description, the optical disc apparatus 1 is equipped with a plurality of semiconductor lasers and a plurality of objective lenses in order to support a plurality of optical disc types. However, it may be equipped with one semiconductor laser and one objective lens, as a matter of course. The present invention can be applied to both the optical disc apparatus supporting only one optical disc type and the optical disc apparatus supporting a plurality of optical disc types.

In addition, in the embodiment described above, the optical disc apparatus can perform reproduction and recording, but the present invention can be applied to an optical disc apparatus that performs one of reproduction and recording.

Note that the present invention is suitable for an optical disc apparatus such as a BD recorder or a BD player.

What is claimed is:

1. An optical disc apparatus comprising:
   an optical pickup that emits light to an optical disc and receives reflection light reflected by the optical disc;
   a temperature sensor for detecting ambient temperature of the optical pickup;
   a control processing portion that performs a control process corresponding to temperature information obtained by the temperature sensor;
   a filter portion that performs filtering of the temperature information detected by the temperature sensor; and
   an A/D converter portion that performs A/D conversion of a signal output from the temperature sensor,
   wherein the filter portion performs filtering of a digital signal output from the A/D converter portion.

2. The optical disc apparatus according to claim 1, wherein the filter portion is a low pass filter that cuts off high frequency components of a predetermined frequency or higher.

3. An optical disc apparatus comprising:
   an optical pickup that emits light to an optical disc and receives reflection light reflected by the optical disc;
   a temperature sensor for detecting ambient temperature of the optical pickup;
   a control processing portion that performs a control process corresponding to temperature information obtained by the temperature sensor;
   a filter portion that performs filtering of the temperature information detected by the temperature sensor;
   wherein the filter portion is a low pass filter that cuts off high frequency components of a predetermined frequency or higher.

4. The optical disc apparatus according to claim 3, wherein the control processing portion selectively switches between temperature information output via the filter portion and temperature information from the temperature sensor.

5. The optical disc apparatus according to claim 3, wherein the temperature sensor is a thermistor disposed on a circuit substrate attached to a base of the optical pickup.

6. An optical disc apparatus comprising:
   an optical pickup that emits light to an optical disc and receives reflection light reflected by the optical disc;
   a temperature sensor for detecting ambient temperature of the optical pickup;
   a control processing portion that performs a control process corresponding to temperature information obtained by the temperature sensor;
   a filter portion that performs filtering of the temperature information detected by the temperature sensor;
   wherein the control processing portion selectively switches between temperature information output via the filter portion and temperature information from the temperature sensor.

* * * * *